United States Patent [19]
Patten et al.

[11] Patent Number: 5,084,486
[45] Date of Patent: Jan. 28, 1992

[54] REACTIVE FEED STREAM TO REPLACE INERT BLOWING AGENT FEED STREAM IN A POLYURETHANE FOAM PROCESS

[75] Inventors: William Patten; Keith D. Cavender, both of Charleston; Frank E. Critchfield, South Charleston, all of W. Va.

[73] Assignee: Union Carbide Chemicals & Plastics Technology Corporation, Danbury, Conn.

[21] Appl. No.: 630,541

[22] Filed: Dec. 20, 1990

[51] Int. Cl.$^5$ ................................. C08V 9/30
[52] U.S. Cl. ..................... 521/126; 521/129; 521/155; 521/163; 521/164; 521/167; 521/170; 521/917
[58] Field of Search ............... 521/126, 129, 155, 163, 521/164, 167, 170, 917

[56] References Cited

U.S. PATENT DOCUMENTS

| | | | |
|---|---|---|---|
| 3,362,919 | 1/1968 | Rood | 521/138 |
| 3,462,083 | 8/1969 | Kontz | 521/917 |
| 4,053,283 | 10/1977 | Schneider et al. | 521/155 |
| 4,199,547 | 4/1980 | Levinsky et al. | 521/917 |
| 4,239,856 | 12/1980 | Rowton . | |
| 4,242,306 | 12/1980 | Kreuer et al. | 521/917 |
| 4,337,318 | 6/1982 | Doyle | 521/917 |
| 4,341,876 | 7/1982 | Kreuer et al. | 521/917 |
| 4,347,330 | 8/1982 | Demou et al. . | |
| 4,608,233 | 8/1986 | Fiorentini | 521/917 |
| 4,668,708 | 5/1987 | Mueller et al. . | |
| 4,931,480 | 6/1990 | Krippl et al. | 521/155 |
| 4,950,694 | 8/1990 | Hager . | |
| 5,000,882 | 3/1991 | Proska et al. | 521/917 |

Primary Examiner—Morton Foelak
Attorney, Agent, or Firm—William F. Gray

[57] ABSTRACT

A process for manufacture of molded, high resiliency, polyurethane foam substantially free of volatile organic blowing agents comprising feeding at least three streams into a mixing device to form a reaction mixture, wherein a first stream contains (i) a polyol, (ii) water, (iii) a catalyst, (iv) a surfactant; a second stream contains an organic polyisocyanate; and a third stream contains (i) water, (ii) a crosslinking/extending agent, and (iii) a process/foam modifier.

33 Claims, No Drawings

REACTIVE FEED STREAM TO REPLACE INERT BLOWING AGENT FEED STREAM IN A POLYURETHANE FOAM PROCESS

BACKGROUND OF THE INVENTION

1. Field of the Invention

This invention relates to a process for the manufacture of molded, high resiliency (HR), polyurethane foams. More particularly, this invention relates to a process for producing molded high resiliency, polyurethane foams without using volatile organic blowing agents such as chlorofluorocarbons, methylene chloride, halocarbons or other volatile organic compounds such as pentane.

2. Description of the Prior Art

High resilience foam technology has provided improved physical foam properties and processing advantages compared with the conventional technology of foam production. The HR foams generally possess outstanding resiliency and cushioning qualities.

In the manufacture of HR molded foam, it is frequently desired to produce articles of different firmness on the same production line. This is currently done by feeding an inert third stream containing volatile organic compounds as "blowing agents", such as chlorofluorocarbons, to a foam mixing device. The use of these blowing agents lowers the foam stiffness as well as the density of the manufactured article. Adequate stiffness is a requirement for end use application. Additionally, foams prepared in this manner can have undesirable properties because the density is too low.

In recent years, processes have been sought by the polyurethane industry for making molded, high resiliency polyurethane foam products while eliminating, or at least substantially reducing, the amount of inert volatile organic blowing agents, particularly chlorofluorocarbons (CFCs). CFCs are known to damage the earth's protective ozone layer, an effect which is expected to lead to a greater incidence of skin cancer and related maladies caused by solar exposure, as well as possible catastrophic climate changes. The U.S. Environmental Protection Agency recently has pushed for a complete phaseout of the use of such ozone-depleting chemicals. Another blowing agent, methylene chloride, also has fallen into disfavor due to concern about short and possibly longer term health effects. Thus, the current trend is to avoid or minimize the use of such inert blowing agents, if possible, in the preparation of polyurethane foams.

Surprisingly, it has been discovered that the use of an inert blowing agent stream in the making of molded, high resiliency polyurethane foams as taught in the prior art can be replaced by a "reactive" third feed stream that controls the stiffness of the foam without adversely affecting other foam properties such as density and density-dependent properties. By "reactive" is meant that the components of the third stream of the present invention react chemically with at least one other component of the other streams, i.e., components of the third stream are not inert.

OBJECTIVES OF THE INVENTION

It is an object of the present invention to produce a molded, high resiliency polyurethane foam substantially free of, and preferably, without using volatile organic blowing agents such as halocarbons, for example, chlorofluorocarbons and methylene chloride or other volatile organic compounds such as pentane. By "volatile" is meant that the blowing agents evaporate from the foam reaction mixture and do not react chemically in the mixture.

Another object of the present invention is to provide a process for making molded high resilience polyurethane foam and foam articles in accordance with automotive industry specifications and requirements, specifically with regard to foam firmness.

SUMMARY OF THE INVENTION

The present invention provides a process for making high resiliency, molded polyurethane foam substantially free of volatile organic blowing agents. The process comprises feeding at least three streams into a foam mixing device to form a reaction mixture. A first stream (1) comprises a mixture of (i) a polyol, (ii) water, (iii) a catalyst, and (iv) a surfactant. A second stream (2) comprises an organic polyisocyanate. A third stream (3), employed in place of a volatile organic blowing agent stream, comprises (i) water, (ii) at least one crosslinking-/extending agent having an average of at least two groups reactive with an isocyanate per molecule and an equivalent weight of less than about 200, and (iii) a process/foam modifier. The three streams are mixed in the foam mixing device to form a reaction mixture. The reaction mixture is transferred to and reacted in a mold.

The present invention also provides a high resiliency, molded polyurethane foam used to make seat cushions, for example, made in accordance with the above-described process and molded articles produced therefrom.

DETAILED DESCRIPTION OF THE INVENTION

The process of the present invention involves preparing a molded, high resiliency foam without utilizing a volatile organic blowing agent stream. In the process of the present invention at least three streams (1), (2) and (3) are fed into a foam mixing device to form a reaction mixture. The reaction mixture is transferred to a mold allowing the foam to expand and cure. The mold can be an open mold or a closed mold. Preferably, the mold is an open mold. The foam is removed from the mold.

STREAM (1)

It should be noted that the components of the first stream may each be added individually to the reaction mixture in separate streams or combined and added in two or three additional streams. However, having the components (polyol, water, catalyst, and surfactant) in a single stream is generally more efficient and preferred.

Polyol

Suitable polyols that can be utilized as a component of the first stream in the process of the present invention include a variety of compounds and encompass, but are not limited to, the following polyether polyols:

(a) alkylene oxide adducts of polyhydroxyalkanes;
(b) alkylene oxide adducts of nonreducing sugars and sugar derivatives;
(c) alkylene oxide adducts of polyphenols; and
(d) alkylene oxide adducts of polyamines and polyhydroxyamines.

Alkylene oxides having two to four carbon atoms generally are employed, with propylene oxide, ethylene oxide and mixtures thereof being particularly preferred.

Illustrative alkylene oxide adducts of polyhydroxyalkanes include, among others, the alkylene oxide adducts of glycerine, 1,2,4-trihydroxybutane, 1,2,6-trihydroxyhexane, 1,1,1-trimethylolethane, 1,1,1-trimethylolpropane, pentaerythritol, xylitol, arabitol, sorbitol, mannitol, and the like.

A further class of polyols which can be employed are the above-mentioned alkylene oxide adducts of the nonreducing sugars and sugar derivatives. Among the nonreducing sugars and sugar derivatives contemplated are sucrose, alkyl glycosides such as methyl glucoside, ethyl glucoside, and the like; glycol glycosides such as ethylene glycol glycoside, propylene glycol glycoside, glycerol glucoside, 1,2,6-hexanetriol glycoside, and the like, as well as the alkylene oxide adducts of the alkyl glycosides as set forth in U.S. Pat. No. 3,073,788.

Another class of suitable polyols, as indicated in (c) above, is the alkylene oxide adducts of polyphenols. Among the polyphenols which are contemplated are, for example, condensation products of phenol and formaldehyde and novolac resins; condensation products of various phenolic compounds and acrolein, the simplest member of this class being 1,2,3-tris(hydroxyphenyl)-propane; condensation products of various phenolic compounds and glyoxal, gluteraldehyde, and other dialdehydes, the simplest members of this class being the 1,1,2,2-tetrakis(hydroxylphenol)ethanes, and the like.

Suitable polyamines and polyhydroxyamines for reaction with alkylene oxides to prepare the polyols of class (d) above include, among others, ethylenediamine, propylenediamine, trimethylenediamine, triethylenediamine, monoethanolamine, diethanolamine, triethanolamine, diisopropanolamine, diethanolmonoisopropanolamine, and the like.

The alkylene oxide adducts of phosphorus and polyphosphorus acids are another useful class of polyols. Ethylene oxide, propylene oxide, the epoxybutanes, 3-chloro-1,2-epoxypropane, and the like are preferred alkylene oxides. Phosphoric acid, phosphorus acid, the polymetaphosphoric acids such as tripolyphosphoric acid, the polymetaphosphoric acids, and the like are desirable for use in this connection.

Indeed, any material having active hydrogens as determined by the Zerewitinoff test may be utilized to some extent and therefore is included within the broad definition of the polyol component of stream (1). For example, amine-terminated polyether polyols, hydroxyl-terminated polybutadiene polyols and many others are known and may be used as a minor component in combination with the above-identified conventional polyether polyols.

Generally, the polyol used in the process of the present invention, i.e., the active hydrogen-containing, polyether polyol component, or blend of polyols, should have an equivalent weight in the range of about 1000 to about 3000, preferably the equivalent weight is in the range of about 1500 to about 2500, and most preferably between and about 1500 and 2200. Equivalent weight is determined from the measured hydroxyl number. Hydroxyl number is defined as the number of milligrams of potassium hydroxide required for the complete hydrolysis of the fully acetylated derivative prepared from one gram of polyol. The relationship between hydroxyl number and equivalent weight is defined by the equation;

$$OH = \frac{56,100}{Eq. Wt.}$$

where OH equals the hydroxyl number of the polyol. Thus, polyols having hydroxyl numbers in the range of about 18 to about 60, preferably between about 22 and 38, and, most preferably, about 25 to 38 are used.

The polyol or polyol blend used in the present invention should have a primary hydroxyl content greater than about 55 percent, preferably about 75 to about 95 percent, most preferably about 85 to about 95 percent.

Polyol compositions used in the process of the present invention have an ethylene oxide content of at least about 10 percent by weight, preferably about 12 to about 25 percent by weight, and, most preferably, about 15 to about 25 percent by weight.

As recognized by those skilled in the art, such polyols will contain a distribution of molecules of differing equivalent weight and hydroxyl contents, and where relevant, a distribution of primary hydroxyl functionality and ethylene oxide contents. The measured hydroxyl number, the calculated equivalent weight and other polyol characteristics, thus represent an average value for each parameter in a polyol or polyol blend. The ranges recited above are intended to refer to the average value for these parameters in the polyol or polyol blend.

The most preferred polyols employed in this invention are the poly(oxyethylene-oxypropylene) triols. Ethylene oxide, can be incorporated in any fashion along the polymer chain. While the ethylene oxide can be incorporated either in internal blocks, as terminal blocks, or may be randomly distributed along the polyol chain, in the present invention to achieve the primary hydroxyl content described above, the ethylene oxide is added as a terminal block i.e., as a cap on the polyol chain.

In one particularly useful embodiment, described more fully hereafter, at least a portion of the polyol component is added to the formulation in the form of a polymer polyol, in which reactive monomers have been polymerized within a polyol to form a stable dispersion of the polymer solids within the polyol. Thus, the polyol component in this preferred embodiment may comprise a polyol blend with one constituent being a conventional polyether polyol, e.g., a polyether triol, and the other constituent being a polymer polyol. The polymer polyol also may comprise the only source of polyol in a particular formulation.

Polymer/polyols are well known in the art. The basic patents in the field are Stamberger U.S. Pat. No. Re. 28,715 (reissue of U.S. Pat. No. 3,383,351) and U.S. Pat. No. Re. 29,118 (reissue of U.S. Pat. No. 3,304,273). Such compositions can be produced by polymerizing one or more ethylenically unsaturated monomers dissolved or dispersed in a polyol in the presence of a free radical catalyst to form a stable dispersion of polymer particles in the polyol. These polymer/polyol compositions have the valuable property of imparting to polyurethane foams produced therefrom higher load-bearing properties than are provided by the corresponding unmodified polyols. Also included are the polyols of the type taught in U.S. Pat. Nos. 3,325,421 and 4,374,209.

Optionally, the first stream can also contain crosslinkers/chain extenders. For example, when the polyisocyanate of the second feed stream contains mostly toluene diisocyanate (TDI), crosslinkers/chain extenders may be required in the first feed stream to impart stability to the foam. Even when foam stability is not a concern, as with certain blends of polymeric diphenylmethane diisocyanate (MDI) and TDI, e.g., 80% TDI and 20% MDI, it may be desirable to add crosslinkers/chain extenders to the first feed stream to improve foam properties such as compression set. When crosslinkers/chain extenders are employed in the first stream, diethanolamine and triethanolamine and mixtures thereof are the preferred. In general, the crosslinkers/chain extenders employed in the first stream should have an average of at least two isocyanate reactive groups per molecule and an equivalent weight of less than 200. Typical levels are from about 0.2 to 10 parts per hundred parts of polyol (php). Levels of 0.5 to 5 php are common. The actual levels used will depend on the nature of the polyisocyanate, the polyol, the water level, the level and nature of the catalysts and the surfactants and these levels may be readily determined by one skilled in the art.

Water

Water is a component of the first stream. In general the amount of water present in the first stream in the process of the present invention ranges from about 1.5 to about 10 parts per hundred parts polyol; preferably about 2 to about 5 parts per hundred parts polyol and, most preferably is about 2.3 to about 4.5 parts per hundred parts polyol.

Catalyst

In addition to a polyol and water, said first stream contains one or more catalysts. Suitable catalysts for use in the present invention include the standard tertiary amines and sometimes in combination with organometallic polyurethane catalysts. Any of a large number of polyurethane catalysts may be utilized for producing the polyurethane foam. Typical levels are from about 0.001 to 5 percent based on the weight of the reaction mixture. Levels of about 0.001 to about 2 php are common. Relative proportions are well-known to those skilled in the art. Representative tertiary amine catalysts include: bis(2,2'-dimethylaminoethyl) ether, trimethylamine, N-methylmorpholine, N,N-ethylmorpholine, N,N-dimethylbenzylamine, N,N-dimethylethanolamine, N,N,N',N'-tetramethyl-1,3-butanediamine, pentamethyldipropylenetriamine, triethylenediamine, pyridine oxide and the like. For best results, use of a particularly good "blow" catalyst, i.e., a catalyst especially effective for catalyzing the water-isocyanate reaction, is important. Consequently, bis(2,2'-dimethylaminoethyl) ether is highly preferred as the amine catalyst.

Suitable organometallic catalysts include the salt of organic acids with a variety of metals such as alkali metals, alkaline earth metals, Al, Sn, Pb, Mn, Co, Bi, and Cu, including, for example, sodium acetate, potassium laurate, calcium hexanoate, stannous acetate, stannous octoate, stannous oleate, lead octoate, metallic driers such as manganese and cobalt napthenate, and the like; and organometallic derivatives of tetravalent tin, trivalent and pentavalent As, Sb, and Bi, and metal carbonyls of iron and cobalt.

Among the organotin compounds that deserve particular mention are dialkyltin salts of carboxylic acids, e.g., dibutyltin diacetate, dibutyltin dilaurate, dibutyltin maleate, dilauryltin diacetate, dioctyltin diacetate, dibutyltin-bis(methylaminobenzoate), dibuytyltin dilaurylmercaptide, dibutyltin-bis(6-methylaminocaproate), and the like. Similarly, there may be used a trialkytin hydroxide, dialkytin oxide, dialkyltin dialkoxide, or dialkyltin dichloride. Examples of these compounds include trimethyltin hydroxide, tributyltin hydroxide, trioctyltin hydroxide, dibutyltin oxide, dioctyltin oxide, dilauryltin oxide, dibutyltin-bis (isopropoxide), dibutyltin-bis(2-dimethylaminopentylate), dibutyltin dichloride, dioctyltin dichloride, and the like.

Other known polyurethane catalysts also can be used in combination with the amine and organometallic catalysts described above. For example, strong bases such as alkali and alkaline earth metal hydroxides, alkoxides, and phenoxides; acidic metal salts of strong acids such as ferric chloride, stannous chloride, antimony trichloride, bismuth nitrate and chloride, and the like; chelates of various metals such as those which can be obtained from acetylacetone, benzoylacetone, trifluoroacetylacetone, ethyl acetoacetate, salicylaldehyde, cyclopentanone-2-carboxylate, acetylacetoneimine, bis-acetylacetonealkylenediimines, salicylaldehydeimine, and the like, with the various metals such as Be, Mg, Zn, Cd, Pb, Ti, Zr, Sn, As, Bi, Cr, Mo, Mn, Fe, Co, Ni, or such ions as $MoO_2++$, $UO_2++$, and the like; alcoholates and phenolates of various metals such as $Ti(OR)_4$, $Sn(OR)_4$, $Sn(OR)_2$ $Al(OR)_3$, and the like, wherein R is an alkyl or aryl, and the reaction products of alcoholates with carboxylic acids, beta-diketones, and 2(N,N-dialkylamino)alkanols, such as the well known chelates of titanium obtained by this or equivalent procedures; all can be employed in the process of the present invention.

Surfactant

A surfactant is contained in the first stream along with a polyol, a catalyst, and water.

It is within the scope of the present invention to employ small amounts, 0.001 to about 5 parts per hundred parts, preferably 0.5 to about 2 parts per hundred parts of polyol in the first stream, of a foam surfactant. Suitable foam surfactants are known and may vary depending upon the particular polyurethane application.

In general, foam surfactants, also referred to in some instances as foam stabilizers, perform two functions. They stabilize the foam and control the cell structure. Typically, the surfactants are polyethersiloxanes or siloxanes having the average general formula, $MD_xD_y*M$ wherein M represents end groups, for example, $(CH_3)_3SiO-$; D represents a group, such as $(CH_3)_2SiO$; D* represents a group, such as $CH_3RSiO$, wherein R is a copolymer of propylene oxide and/or ethylene oxide having capped or uncapped hydroxyl end groups. Additionally, R can also be the same or different and can be selected from the group consisting of a nitrile, a linear alkyl group, a branched alkyl group, an aromatic group, and a chloroalkyl group.

Performance of the surfactant is determined by the composition of the siloxane backbone, type of pendant R groups, and molecular weight. In the formula above, in general, each x and y ranges from about 0 to about 10. When x or y alone is present, each x or y may range from about 0.1 to about 10, preferably from about 0.5 to about 4.

Silicone surfactants that are employed in the preparation of polyurethane foams of the present invention are selected from the group consisting of an organopolysiloxane copolymer, a polysiloxane, and mixtures thereof. Surfactants such as those disclosed in U.S. Pat. Nos. 4,746,683; 4,760,955; 3,741,917; 4,031,044;

4,777,601; 4,690,955; 3,839,384; 3,896,062; 4,139,503; and 4,309,508 can be used in the process of the present invention. Suitable surfactants such as L-5307, L-5309, Y-10,515, Y-10,366 and Y-10184 are available from Union Carbide Chemicals and Plastics Company Inc.

STREAM (2)

Polyisocyanate

A second stream in the process of the present invention comprises a polyisocyanate. In general, the organic polyisocyanates which can be used in the preparation of foams in accordance with this invention can be represented by the formula: $R(NCO)_z$, wherein R is a polyvalent organic radical that is either aliphatic, aralkyl, alkaryl, aromatic or mixtures thereof, and z is an integer corresponds to the valence of R and is at least 2.

Useful organic polyisocyanates are organic compounds that contain at least two isocyanate groups. Such compounds are well known in the art. Suitable organic polyisocyanates include the hydrocarbon diisocyanates, e.g., the alkylene diisocyanates and the arylene diisocyanates. Examples of suitable polyisocyanates are 2,4-diisocyanatotoluene (2,4-toluene diisocyanate), 2,6-diisocyanatotoluene (2,6-toluene diisocyanate), methylene bis (4-cyclohexylisocyanate), 1,8-diisocyanatooctane, 1,5-diisocyanato-2,2,4-trimethylpentane, 1,9-diisocyanatononane, 1,10-diisocyanatopropylether of 1, 4-butylene glycol. 1,11-diisocyanatoundecane, 1,12-diisocyanatododecane bis (isocyanatohexyl) sulfide, 1, 4-diisocyanatobenzene, 3,5-diisocyanato-o-xylene, 4,6-diisocyanato-m-xylene, 2,6-diisocyanato-p-xylene, naphthalene-1,4-diisocyanate 2, 4-diisocyanato-1-chlorobenzene, and 2,5-diisocyanate-bis (3-methyl-4-isocyanotophenyl) methane 1-nitrobenzene, 4,4'-diphenylmethylene diisocyanate, 2,4'-diphenylmethylene diisocyanate, and 4,4'-diphenylpropane diisocyanate, polymethylene poly (phenyleneisocyanates), and mixtures thereof.

Polyisocyanates useful as a second stream in the process of the present invention can be utilized in both their purified or neat forms and their polymeric forms as a minor component in admixture with the above noted difunctional isocyanates, particularly with 2,4- and 2,6-toluene diisocyanate. Polyisocyanates used in the process of the present invention have isocyanate indexes ranging from about 50 to about 130, preferably from about 70 to about 115, most preferably about 75 to about 100.

Preferred polyisocyanates are TDI (i.e., a mixture of 80% 2,4-toluene diisocyanate and 20% 2,6-toluene diisocyanate); MDI (diphenylmethane diisocyanate) alone or in mixture with its polymeric forms; and mixtures of TDI and MDI. In general, mixtures of TDI and MDI are from about 70 to about 80 percent TDI and about 20 to about 30 percent MDI.

REACTIVE THIRD STREAM (3)

A key feature of the process of the present invention involves the use of a reactive third stream for enhancing the properties, particularly firmness, of molded, HR foam. The third stream is preferably fed to a foam mixing device in place of a stream containing a volatile organic blowing agent. The third stream consists essentially of (i) water; (ii) at least one crosslinking/extending agent; and (iii) a process/foam modifier. In the reaction mixture of streams (1), (2) and (3), the third stream (3) is about 0.5 to about 10, preferably about 1 to about 6, and most preferably about 1.5 to about 3.5 parts per hundred parts based on the amount of polyol in the first stream. In the process of the present invention, the greater the amount of the third stream in the reaction mixture, the softer the resultant foam.

Thus the third stream contains water (i) in an amount ranging from about 5 to about 90 weight percent, preferably from about 10 to about 40 weight percent. Most preferably, the amount of water is about 20 to about 30 percent by weight based on the total weight of the components in the third stream.

The reactive third stream also contains at least one crosslinking/extending agent (ii). The crosslinking/extending agent of the third stream is used in an amount ranging from about 5 to about 75% by weight of the total weight of the components in the third stream. Preferably, the crosslinking/extending agent ranges from about 20 to about 60% by weight, and, most preferably, ranges from about 30 to about 45% by weight of the total weight of the components in the third stream.

Suitable crosslinking/extending agents are those materials which are reactive with isocyanate groups particularly compounds having hydroxyl and/or primary or secondary amine groups and include: (1) crosslinking compounds of an equivalent weight less than about 200, and/or (2) difunctional extender compounds, other than those having only secondary hydroxyl groups, of equivalent weight less than about 200. Preferably, the crosslinking/extending agent has a nominal functionality in the range of 2 to about 8.

A low molecular weight polyfunctional glycolamine crosslinking/extending agent is preferred to make foams under the conditions of this invention. Diethanolamine (DEOA) is the compound of choice. Blends of other crosslinkers and/or extenders with diethanolamine can also provide similar advantages.

Though diethanolamine is preferred, other crosslinking/extending agents such as, glycerine, triethanolamine, disopropanolamine, ethylene glycol, butanediol, tetraethylenepentamine, polyethyleneimine, the isomers of phenylene diamine, sorbitol, erythritol, sucrose, trimethylopropane, pentaerythritol, 2, 4, 6-triaminotoluene, isophorone diamine, diethyl tolylenediamine, ethanolamine, hydrazine, 4, 4-methylenebis (o-chloroaniline), simple carbohydrates, low molecular weight alkylene oxide, e.g. ethylene oxide, and propylene oxide, adducts of polyfunctional amines or alcohols (e.g. polyfunctional glycols), alkylene oxide adducts of polyfunctional aminoalcohols and polyfunctional alcoholamines, amine-terminated polyalkylene oxides and many other low molecular weight polyfunctional hydroxy and/or amine compounds can be substituted for diethanolamine if desired.

A third component of the reactive third stream comprises a process/foam modifier. Polyethylene oxide monols and/or polyols are preferred process/foam modifiers. Suitable polyethylene oxide monol or polyols are those ethylene oxide adducts which contain greater than about 50% ethylene oxide, preferably greater than about 60% and most preferably greater than about 75% by weight ethylene oxide, and have an equivalent weight ranging from about 150 to about 5000; preferably from 300 to about 1000; and most preferably from about 300 to about 700. The polyethylene oxide preferably has a hydroxyl functionality of two or greater.

In the third stream of the process of the present invention a process/foam modifier, e.g. the polyethylene oxide monol and/or polyol, is used in an amount ranging from about 5 to 75% by weight of the total weight of the components in the third stream; preferably from about 20 to 60%; and, most preferably, 30 to 45% by weight of the total weight of the components in the third stream.

In the present invention the process/foam modifier raises the viscosity of the third stream so that the stream can be pumped or monitored precisely. The modifier also functions as a cell opening agent and aids in adjusting the foam stiffness to a desired level without adversely affecting other foam properties.

Other Additives

A variety of other additives known to those skilled in the art also may be incorporated in the foam formulations of the process of the present invention in accordance with techniques known in the art. These may include flame retardants, colorants, mineral fillers, and other materials.

The following examples are presented to illustrate and not limit the invention. Unless otherwise indicated, the ingredients identified in the following tables are reported as parts by weight.

Whereas the exact scope of the present invention is set forth in the appended claims, the following specific examples illustrate certain aspects of the present invention and, more particularly, point out methods of evaluating the same. However, the examples are set forth for illustration only and are not to be construed as limitations on the present invention except as set forth in the appended claims. All parts and percentages are by weight unless otherwise specified.

DEFINITIONS

Polymer/Polyol A—A polymer/polyol sold by AC West Virginia Polyol Company as E-519. It contains 28 weight percent polymer and has a hydroxyl number of 25.

Polyol B—A polyol made by reacting propylene oxide with glycerine in the presence of potassium hydroxide catalyst, capping with ethylene oxide and refining to remove the catalyst. The polyol contains about 15 weight percent ethylene oxide as a cap and has a hydroxyl number of about 35.

Catalyst A—A polyurethane foam bis-(2-dimethylaminoethyl)ether catalyst sold as "NIAX Catalyst A-1" by Union Carbide Chemicals and Plastics Company Inc.

Catalyst B—A polyurethane foam 3-dimethylamino-N,N-dimethylaminopropionamide catalyst sold as "NIAX Catalyst A-4" by Union Carbide Chemicals and Plastics Company Inc.

Catalyst C—A polyurethane foam triethylenediamine catalyst sold as "NIAX Catalyst A-33" by Union Carbide Chemicals and Plastics Company Inc.

Catalyst D—dibutyltin dilaurylmercaptide.

Polyisocyanate A—A blend of 80% TDI and 20% polymeric MDI. TDI is a blend of 80% 2,4-toluene diisocyanate and 20% 2,6-toluene diisocyanate. The polymeric MDI is Rubinate M sold by ICI Americas Corporation.

Reactive Third Stream—a blend of water (25%), diethanolamine (37.5%), and an ethylene oxide adduct of glycerine to a molecular weight of 990 (37.5%).

Surfactant 1—a silicone surfactant sold by Union Carbide Chemicals and Plastics Company Inc. as L-5307.

FOAM PROPERTIES

ASTM D-3574-86 test procedures were followed except for porosity and as otherwise indicated.

Density is the weight of foam per unit volume reported in pounds per cubic foot (pcf).

Resilience is the ball rebound (ASTM D-3574) expressed as a %.

Porosity is a measure of the air flow rate through a one-half inch thick sample of the foam reported in cubic feet per minute per square foot of foam surface area at a differential pressure across the sample of 0.1 inch of water. A five (5) inch by (5) inch specimen of foam ½ inch in thickness is compressed between two pieces of flanged plastic tubing 2¼ inches in diameter (ID). This assembly then becomes a component in an air flow system. Air at a constant inlet pressure of 14.7 psig and at a controlled velocity enters one end of the tubing, flows through the foam specimen and exits through a restriction at the lower end of the assembly. The pressure drop across the foam due to the restriction of air passage through the foam is measured by the means of an inclined closed manometer. One end of the manometer is connected to the upstream side of the foam and the other end to the downstream side. The flow of air on the upstream side of the foam specimen is adjusted to maintain a differential pressure across the specimen of 0.1 inch of water. The porosity of the foam is the flow rate of air under this condition reported in units of air flow per unit area of specimen, cubic feet per minute per square foot.

IFD 25% is the load (indentation force deflection) at 25% compression in lbs. per 50 sq. inches. IFD is a measure of a foam's firmness. Test specimen size was typically 12×12×4 inches for bench foams and 15×15×4 inches for machine foams.

IFD 50% is the load (indentation force deflection) at 50% compression in lbs. per 50 sq. in.

IFD 65% is the load (indentation force deflection) at 65% compression in lbs. per 50 sq. inches.

Return Value is the percentage of the 25% IFD recovered after cycling through the 65% IFD measurement and returning to 25% compression.

IFD 65/25 is the 65% IFD divided by the 25% IFD and is often referred to as support, sag or sac factor or load ratio.

Tensile is the tensile strength reported in psi.

Elongation is the % elongation of the foam specimen at break.

Tear is the tearing strength reported in pounds per linear inch.

75% Comp set is the dry heat aged compression set (loss in height) after holding in a 75% compressed state for 22 hours at 158° F.

50% HACS is the humid aged (6 hrs. at 220° F. and 95% relative humidity) compression set measured after the humid aging by holding in a 50% compressed state for 22 hours at 158° F.

PROCEDURE

All molded foams were prepared with an Admiral low pressure mixing machine as described in Table I. Three streams were fed to the foam mixing device at the prescribed rates. The first stream containing the polyol and the second stream containing the polyisocyanate were held at constant feed rates and the third stream was varied in order to achieve multiple grades of foam varying in firmness, i.e., IFD values.

Liquid foam was poured into an open aluminum mold 15×15×5 inches. The mold lid was closed immediately thereafter. The finished molded cushion was removed 7 minutes later. The foams were crushed to 90% deflection three times after demolding. Then the foams were postcured for 20 minutes in an oven preset at 250° F., and foam physical properties were measured after a minimum of three days aging.

TABLE I
HIGH RESILIENCE MOLDED POLYURETHANE FOAM PROCESS CONDITIONS

A. MACHINE

| | |
|---|---|
| Type | Admiral Low Pressure (2M) |
| Throughput, lbs/min | 45 |
| Number of Streams | 2 and 3 |
| Stream Temp., °F. (Resin/ISO) | 70/75 |

B. MOLDING

| | |
|---|---|
| Mold Construction | Aluminum |
| Type Mold | 15 × 15 × 5-Inches |
| Release Agent | CT-1189* |
| Demold Temp., °F. | 150 |
| Wax Application Temp., °F. | 150 |
| Pour temp., °F. | 150 |
| Demold Time, min. | 7 |
| Post-Cure | 20 min. @ 250° F. |

*A wax in an organic solvent available from Chemtrend Corporation.

TABLE II

| | CONTROL | | | | | | | |
|---|---|---|---|---|---|---|---|---|
| Example No. | A | B | 1 | 2 | 3 | 4 | 5 | 6 |
| First Stream Components | | | | | | | | |
| Polymer/Polyol A | 37 | 37 | 37 | 37 | 37 | 37 | 37 | 37 |
| Polyol B | 63 | 63 | 63 | 63 | 63 | 63 | 63 | 63 |
| Water | 3.35 | 3.35 | 3.35 | 3.35 | 3.35 | 3.35 | 3.35 | 3.35 |
| Catalyst A | 0.1 | 0.1 | 0.1 | 0.1 | 0.1 | 0.1 | 0.1 | 0.1 |
| Catalyst B | 0.2 | 0.2 | 0.2 | 0.2 | 0.2 | 0.2 | 0.2 | 0.2 |
| Catalyst C | 0.35 | 0.35 | 0.35 | 0.35 | 0.35 | 0.35 | 0.35 | 0.35 |
| Surfactant 1 | 1.2 | 1.2 | 1.2 | 1.2 | 1.2 | 1.2 | 1.2 | 1.2 |
| Catalyst D | 0.01 | 0.01 | 0.01 | 0.01 | 0.01 | 0.01 | 0.01 | 0.01 |
| Second Stream Component | | | | | | | | |
| Polyisocyanate A | 41.4 | 41.4 | 41.4 | 41.4 | 41.4 | 41.4 | 41.4 | 41.4 |
| Third Stream Component | — | — | 1.5 | 1.5 | 2.4 | 2.4 | 3.3 | 3.3 |
| Reaction Mixture Isocyanate Index: | 104 | 104 | 91 | 91 | 85 | 85 | 80 | 80 |
| Foam Properties | | | | | | | | |
| Overall Density, pcf | 2.0 | 2.0 | 2.0 | 2.0 | 2.0 | 2.0 | 2.0 | 2.0 |
| Resilience, % ball rebound | 54 | 52 | 62 | 64 | 61 | 61 | 54 | 60 |
| Air Porosity, CFM/ft2 | 16 | 16 | 35 | 32 | 32 | 32 | 21 | 21 |
| IFD, lbs/50 in$^2$ | | | | | | | | |
| 25% def. | 22.3 | 23.3 | 18.1 | 17.8 | 14.4 | 16.0 | 13.1 | 14.1 |
| 50% def. | 42.5 | 43.5 | 34.1 | 33.8 | 28.7 | 31.4 | 26.5 | 26.6 |
| 65% def. | 67.3 | 68.5 | 53.2 | 52.7 | 45.8 | 49.5 | 42.2 | 41.8 |
| Return Value, % | 81 | 80 | 81 | 82 | 81 | 81 | 81 | 82 |
| Load Ratio | 3.0 | 3.0 | 2.9 | 3.0 | 3.2 | 3.1 | 3.2 | 3.0 |
| Tensile Strength, psi | 22 | 19 | 20 | 21 | 22 | 17 | 17 | 20 |
| Elongation, % | 200 | 179 | 187 | 187 | 204 | 170 | 182 | 204 |
| Tear Strength, lbs/in | 1.7 | 1.6 | 1.4 | 1.4 | 1.2 | 1.3 | 1.2 | 1.2 |
| 75% Comp. Set, % | 13.1 | 12.2 | 11.5 | 12.3 | 19.1 | 16.7 | 18.8 | 15.1 |
| 50% HACS, % | 25.2 | 24.3 | 26.1 | 27.8 | 36.3 | 30.4 | 36.0 | 30.6 |

Table II demonstrates the utility of a reactive third stream. Control Foam Examples A and B were prepared without the use of a reactive third stream. Foam Examples 1 through 6 were prepared with increasing levels of the reactive third stream ranging from 1.5 to 3.3 PBW. An analysis of the physical properties obtained on the test foams showed a dramatic decrease in foam firmness values, e.g., 65% IFDs were lowered from 68 lbs/50 in$^2$ down to 42 lbs/50 in$^2$. Many other grades of foam can be attained depending on the feed level of the third stream. It is important that other foam physical properties were either unaffected or changes were relatively small and would not adversely affect the utility of the foam. In general, foam properties of those examples prepared using a reactive third stream in place of an inert blowing agent stream would meet most existing automotive standards for seat cushioning.

We claim:

1. A process for the manufacture of molded, high resiliency polyurethane foam, substantially free of volatile organic blowing agents, which comprises:
   a. feeding at least three feed streams to a foam mixing device to form a reactive mixture wherein
      (1) a first feed stream comprises a blend of
         (i) a polyol;
         (ii) water;
         (iii) a catalyst; and
         (iv) a surfactant;
      (2) a second feed stream comprises an organic polyisocyanate; and
      (3) a third feed stream that replaces a volatile organic blowing agent stream consists essentially of a mixture of
         (i) water;
         (ii) a crosslinking/chain extending agent having an average of at least two isocyanate reactive groups per molecule and an equivalent weight of less than about 200; and
         (iii) a process/foam modifier;
   b. transferring and reacting said reaction mixture in a mold.

2. The process according to claim 1 wherein the polyol in the first stream has an equivalent weight ranging from about 1000 to about 3000; a nominal functionality of at least two, a hydroxyl number ranging from about 18 to about 60, a primary hydroxyl content greater than about 55 percent, and an ethylene oxide content of at least 10 percent by weight of the polyol, and optionally containing a stably dispersed solid formed by in situ polymerization of monomers within the polyol.

3. The process of claim 2 wherein the polyol in the first stream has an equivalent weight ranging from about 1500 to about 2500, a hydroxyl number ranging from about 22 to about 38, a primary hydroxyl content ranging from about 75 to about 95 percent, and an ethylene oxide content ranging from about 12 to about 25 percent by weight of the polyol.

4. The process according to claim 3 wherein the polyol in the first stream has an equivalent weight ranging from about 1500 to about 2200, a hydroxyl number ranging from about 25 to about 38, a primary hydroxyl content ranging from about 85 to about 95 percent, and an ethylene oxide content ranging from about 15 to about 25 percent by weight of the polyol.

5. The process according to claim 1 wherein the polyol is a polyether polyol.

6. The process according to claim 1 wherein the amount of water in the first stream ranges from about 1.5 to about 10 parts per hundred parts polyol.

7. The process according to claim 6 wherein the water in the first stream ranges from about 2 to about 5 parts per hundred parts polyol.

8. The process according to claim 7 wherein the water in the first stream ranges from about 2.3 to about 4.5 parts per hundred parts polyol.

9. The process according to claim 1 wherein the amount of catalyst ranges from about 0.001 to about 5 parts per hundred parts polyol in the first stream.

10. The process according to claim 1 wherein the catalyst comprises an amine catalyst and optionally an organometallic catalyst.

11. The process according to claim 10 wherein the catalyst comprises a tertitary amine catalyst and an organo-tin catalyst.

12. The process according to claim 11 wherein the amount of the organo-tin catalyst ranges from about 0.001 to about 0.2 parts per hundred parts polyol in the first stream.

13. The process according to claim 1 wherein the surfactant in the first stream is selected from the group consisting of an organo-polysiloxane copolymer, a polysiloxane, and mixtures thereof.

14. The process according to claim 13 wherein the amount of surfactant ranges from about 0.001 to about 5 parts per hundred parts of the polyol in the first stream.

15. The process according to claim 1 wherein the organic polyisocyanate of the second stream is selected from the group consisting of TDI, MDI, and mixtures of TDI and MDI.

16. The process according to claim 15 wherein the amount of water in the third stream ranges from about 5 to about 90 weight percent based on the total weight of the components in the third stream.

17. The process according to claim 16 wherein the amount of water ranges from about 10 to about 40 weight percent based on the total weight of the components in the third stream.

18. The process according to claim 17 wherein the amount of water ranges from about 20 to about 30 weight percent based on the total weight of the components in the third stream.

19. The process according to claim 1 wherein the crosslinking/chain extending agent is selected from the group consisting of diethanolamine, triethanolamine, diisopropanolamine, ethylene glycol, glycerine, trimethylolpropane, sorbitol, sucrose, butanediol, the isomers of phenylene diamine, pentaerythritol, 2,4,6-triaminotoluene, isophoronediamine, diethyltoluene diamine, ethanolamine, hydrazine, simple carbohydrates and low molecular weight alkylene oxide adducts of (i) polyfunctional amines, (ii) polyfunctional alcohols, (iii) aminoalcohols, (iv) alcoholamines, and mixtures thereof.

20. The process according to claim 19 wherein the crosslinking/chain extending agent is selected from the group consisting of diethanolamine, triethanolamine and mixtures thereof.

21. The process according to claim 20 wherein the crosslinking/chain extending agent is diethanolamine.

22. The process according to claim 1 wherein the crosslinking/chain extending agent ranges from about 5 to about 75 percent by weight based on the total weight of the components in the third stream.

23. The process according to claim 22 wherein the crosslinking/chain extending agent ranges from about 20 to about 60 percent by weight based on the total weight of the components in the third stream.

24. The process according to claim 23 wherein the crosslinking/chain extending agent ranges from about 30 to about 45 percent by weight based on the total weight of the components in third stream.

25. The process according to claim 1 wherein the process/foam modifier of the third stream is selected from the group consisting of a polyethylene oxide monol, a polyol, or mixture thereof wherein the ethylene oxide content is greater than about 50 percent by weight of the process/foam modifier and has an equivalent weight ranging from about 150 to about 5,000.

26. The process according to claim 25 wherein the process/foam modifier has an ethylene oxide content greater than 60 percent by weight of the process/foam modifier and has an equivalent weight ranging from about 300 to about 1,000.

27. The process according to claim 26 wherein the process/foam modifier has an ethylene oxide content greater than 75 percent by weight of the process/foam modifier and has an equivalent weight ranging from about 300 to about 700.

28. The process according to claim 1 wherein the process/foam modifier ranges from about 5 to about 75 weight percent based on the total weight of the components in the third stream.

29. The process according to claim 28 wherein the process/foam modifier ranges from about 20 to about 60 weight percent based on the total weight of the components in the third stream.

30. The process according to claim 31 wherein the process/foam modifier ranges from about 30 to about 45 weight percent based on the total weight of the components in the third stream.

31. The process according to claim 1 wherein the third stream ranges from about 0.3 to about 10 parts per hundred parts by weight based on the polyol of the first stream.

32. The process according to claim 31 wherein the third stream ranges from about 0.5 to about 5 parts per hundred parts by weight based on the polyol of the first stream.

33. The process of claim 1 wherein the polyol, the water, the catalyst, and the surfactant are fed individually or combined in additional feed streams.

* * * * *